United States Patent Office 2,905,675
Patented Sept. 22, 1959

2,905,675
5-ANDROSTENE-17β-AMINES AND PROCESS

Fred Kagan and Robert D. Birkenmeyer, Kalamazoo, Mich., assignors to The Upjohn Company, Kalamazoo, Mich., a corporation of Delaware No Drawing. Application January 5, 1959
Serial No. 784,898

18 Claims. (Cl. 260—397)

This invention relates to 3β-halo-N,N-bis-(2-haloethyl)-5 - androsten - 17β - amine and 3β - halo - N - (2 - haloethyl)-5-androsten-17β-amine and is more particularly concerned with 3β-chloro-N,N-bis-(2-chloroethyl)-5-androsten - 17β - amine, 3β - chloro - N - (2 - chloroethyl)-5 - androsten - 17β - amine, 3β - chloro - N,N - bis - (2-iodoethyl) - 5 - androsten - 17β - amine, 3β - chloro - N-(2 - iodoethyl) - 5 - androsten - 17β - amine, 3β - bromo-N,N - bis - (2 - bromoethyl) - 5 - androsten - 17β-amine, 3β - bromo - N - (2 - bromoethyl) - 5 - androsten - 17β - amine, 3β - bromo - N,N - bis - (2 - iodoethyl) - 5 - androsten - 17β - amine, 3β - bromo - N - (2 - iodoethyl) - 5 - androsten - 17β - amine, the intermediates 17β - bis - (2 - hydroxyethyl)amino - 5 - androsten - 3β-ol and 17β-(2-hydroxyethyl)amino-5-androsten-3β-ol and a process for the production thereof. The new compounds of this invention include not only the free amines listed above, but also their pharmacologically acceptable mineral and organic acid salts, for example, the sulfates, hydrochlorides, and acetates.

The new compounds and the process of the present invention are illustratively represented by the following formulae:

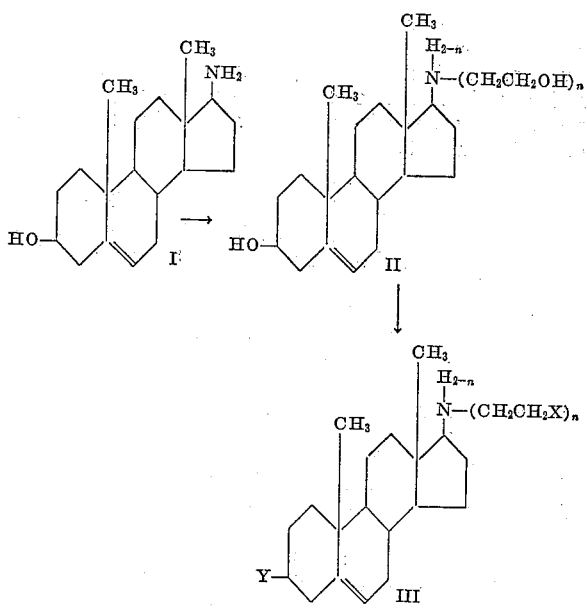

wherein n is a whole number from 1 to 2, inclusive, Y is chlorine or bromine, and X is a halogen of atomic weight from 35 to 127, inclusive, i.e., chlorine, bromine, and iodine.

The novel compounds of this invention exhibit diuretic, central nervous system depressing and hypotensive activities. Further, the novel compounds of this invention are related to the simple nitrogen mustards, such as bis- and tris-(2-chloroethyl)amines, and they possess the general chemical reactivities ascribable to the bis-(2-chloroethyl)amino group. Administration of the novel steroids to the animal organism can be in conventional dosage forms such as pills, tablets, capsules, syrups or elixirs for oral use, or in liquid forms which are adaptable to the natural and synthetic cortical steroid hormones for injectable products.

The process of the present invention comprises: treating 17β-amino-5-androsten-3β-ol (I) with an hydroxyethylating agent such as ethylene oxide or ethylene chlorohydren to obtain a mixture of 17β-bis-(2-hydroxyethyl)-amino-5-androsten-3β-ol and 17β-(2-hydroxyethyl)amino-5-androsten-3β-ol, and treating the said hydroxyethylaminosteroids (II) with a halogenating agent such as thionyl halide or phosphorus oxyhalide, wherein the halogen is of atomic weight between 35 and 80, inclusive, to obtain 3β - halo - N,N - bis - (2 - haloethyl) - 5 - androsten - 17β - amine and 3β - halo - N - (2 - haloethyl) - 5 - androsten-17β-amine (III), wherein the halogen is of atomic weight between 35 and 80, inclusive. The iodo compounds of the invention: namely, 3β-chloro-N,N-bis-(2 - iodoethyl) - 5 - androsten - 17β - amine, 3β - chloro-N - (2 - iodoethyl) - 5 - androsten - 17β - amine, 3β-bromo - N,N - bis - (2 - iodoethyl) - 5 - androsten - 17β-amine, 3β - bromo - N - (2 - iodoethyl) - 5 - androsten-17β-amine, are obtained from the corresponding chloroethyl or bromoethyl compounds, represented by Formula III, by metathetic reaction using an alkali metal iodide such as sodium or potassium iodide, preferably in the presence of an inert solvent such as acetone.

The starting compound of the present invention is 17β-amino-5-androsten-3β-ol [L. Ruzicka and M. W. Goldberg, Helv. Chim. Acta., 19, 107 (1936)]. In carrying out the process of the present invention, 17β-amino-5-androsten-3β-ol is treated with an hydroxyethylating agent, for example, ethylene oxide or ethylene chlorohydrin. In the preferred embodiment of the present invention the steroid is usually reacted with the hydroxyethylating agent in an inert solvent such as benzene, toluene, xylene, cyclohexane and the like, at a temperature between 75 and 150° C., and under pressure to prevent escape of the hydroxyethylating reagent. Excess hydroxyethylating agent (ethylene oxide, ethylene chlorohydrin) may be used instead of an inert solvent. The time of reaction is usually between 8 and 24 hours, after which the resulting crude mixture of 17β-bis-(2-hydroxyethyl)amino-5-androsten-3β-ol is recovered by filtration or evaporation, and washed with an organic hydrocarbon solvent such as petroleum ether, hexanes, or benzene. Pure 17β-bis-(2-hydroxyethyl)amino-5-androsten-3β-ol is obtained by recrystallizing the crude mixture from, for example, acetone or methanol. 17β-(2-hydroxyethyl)-amino-5-androsten-3β-ol is obtained from the mother liquors by chromatography over Florisil (synthetic magnesium silicate) followed by crystallization from, for example, acetone or methanol. For the purpose of obtaining the final products it is unnecessary to purify the crude mixture of 2-hydroxyethylaminosteroids, which can be used directly in the next step.

The crude mixture of 17β-bis-(2-hydroxyethyl)amino-5-androsten-3β-ol and 17β-(2-hydroxyethyl)amino - 5-androsten-3β-ol is treated with a suitable halogenating agent wherein the halogen is of atomic number between 17 and 35, inclusive, for example, thionyl chloride, thionyl bromide, phosphorus oxychloride or phosphorus oxybromide. In the preferred embodiment of the present invention the steroid is usually reacted with the halogenating agent (thionyl chloride, phosphorus oxybromide or the like) in an inert solvent such as benzene, toluene or xylene, at a temperature between 25 and 100° C. Alternatively, excess halogenating agent can be used instead of the inert solvent. The time of reaction is usually between 2 and 24 hours, at the end of which time a precipitate of 3β-halo-N-(2-haloethyl)-5-androsten-17β-amine hydrohalide can be separated from the reaction mixture, as by filtration. The filtrate is evaporated to give crude 3β-halo-N,N-bis-(2-haloethyl)-5-androsten-17β-amine which can be purified by conventional means, for example, by crystallization from alcohol, acetone, acetone-water mixture, and the like.

Treating pure 17β-bis-(2-hydroxyethyl)amino-5-androsten-3β-ol or pure 17β-(2-hydroxyethyl)amino-5-androsten-3β-ol with a halogenating agent in the manner described above is productive of the corresponding 3β-halo-N,N-bis-(2-haloethyl)-5-androsten-17β-amine or 3β-halo-N-(2-haloethyl)-5-androsten-17β-amine, wherein the halogen is of atomic weight between 35 and 80, inclusive.

The iodo compounds of the present invention are prepared from the corresponding chloro or bromo compounds by treatment with an alkali metal iodide, such as sodium or potassium iodide, preferably in an inert organic solvent such as acetone, acetic acid, methyl ethyl ketone, and the like. An excess of the alkali metal iodide (3 to 10 moles) is generally used. When the reaction mixture is heated at 50 to 70° for 10 to 30 hours, replacement of the chlorine or bromine in the haloethyl grouping is achieved. Under these conditions, 3β-chloro-N,N-bis-(2-iodoethyl)-5-androsten-17β-amine, 3β-chloro-N-(2-iodoethyl)-5-androsten-17β-amine, 3β-bromo-N,N-bis-(2-iodoethyl)-5-androsten-17β-amine, and 3β-bromo-N-(2-iodoethyl)-5-androsten-17β-amine are prepared from 3β-chloro-N,N-bis-(2-chloroethyl)-5-androsten-17β-amine, 3β-chloro-N-(2-chloroethyl)-5-androsten-17β-amine, 3β-bromo-N,N-bis-(2-bromoethyl)-5-androsten-17β-amine and 3β-bromo-N-(2-bromoethyl)-5-androsten-17β-amine, respectively. The product can be isolated, when the solvent is water miscible, by adding a large volume of water and separating the precipitated steroid by filtration or extraction with, for example, methylene chloride. Alternatively, the product may be recovered by evaporation of the solvent from the reaction mixture, or by chilling the reaction mixture to obtain the product as a crystalline precipitate.

The following examples are illustrative of the process and products of the present invention, but are not to be construed as limiting.

EXAMPLE 1

*17β-bis-(2-hydroxyethyl)amino-5-androsten-3β-ol and 17β-(2-hydroxyethyl)amino-5-androsten-3β-ol*

In a 100 ml. stainless steel autoclave was placed a reaction mixture of 2 g. of 17β-amino-5-androsten-3β-ol [L. Ruzicka and M. W. Goldberg, Helv. Chim. Acta., 19, 107 (1936)], 20 ml. of benzene and 2 ml. of ethylene oxide. The reaction mixture was heated at 125° C. with stirring for 18 hours, giving a slurry which was washed onto a filter with benzene. The slurry was washed with petroleum ether and dried to give 2 g. of a crude mixture of 17β-bis-(2-hydroxyethyl-amino-5-androsten-3β-ol and 17β-(2-hydroxyethyl)amino-5-androsten-3β-ol having a melting point of 192 to 198° C. The crude mixture was recrystallized 4 times from acetone to give an analytical sample of 17β-bis-(2-hydroxyethyl)amino-5-androsten-3β-ol having a melting point of 205 to 208° C. and the following analysis:

*Analysis.*—Calculated for $C_{23}H_{39}NO_3$: C, 73.16; H, 10.41; N, 3.71. Found: C, 73.04; H, 10.39; N, 3.82.

The acetone mother liquors from the crystallization of 17β-bis-(2-hydroxyethyl)amino-5-androsten-3β-ol are combined and concentrated by evaporation to obtain a dry residue. The residue is dissolved in a one to one mixture of methylene chloride and Skellysolve B hexanes and placed on a column of Florisil synthetic magnesium silicate which is then developed with mixtures of acetone and Skellysolve B hexanes containing increasing proportions of acetone from 2 to 50%. The first main fraction, obtained by evaporation of the eluate, consists of 17β-bis-(2-hydroxyethyl)amino-5-androsten - 3β - ol; the second main fraction is 17β-(2-hydroxyethyl)amino-5-androsten 3β-ol.

EXAMPLE 2

*3β-chloro - N,N - bis-(2 - chloroethyl) - 5-androsten-17β-amine and 3β-chloro-N-(2-chloroethyl)-5 - androsten-17β-amine*

A reaction mixture consisting of 1 g. of a crude mixture of 17β-bis-(2-hydroxyethyl)amino-5-androsten-3β-ol and 17β-(2-hydroxyethyl)amino-5-androsten-3β-ol, 7 ml. of thionyl chloride, and 40 ml. of dry benzene was heated at about 40° C. for 16 hours. At the end of the reaction period a benzene-insoluble precipitate was separated by filtration and crystallized from an acetone-water mixture to obtain 3β-chloro-N-(2-chloroethyl)-5-androsten 17β-amine hydrochloride having a melting point of 281° C. and the following analysis:

*Analysis.*—Calculated for $C_{21}H_{32}Cl_2N_2 \cdot HCl$: C, 61.99; H, 8.42; N, 3.44; Cl, 26.14. Found: C, 61.96; H, 8.84; N, 3.44; Cl, 26.38.

Treating the above hydrochloride with one equivalent of sodium or potassium hydroxide in aqueous alcohol gave 3β-chloro-N-(2-chloroethyl)-5-androsten-17β-amine.

The filtrate remaining from the separation of the 3β-chloro-N-(2-chloroethyl)-5-androsten-17β-amine hydrochloride was evaporated, giving about 1 g. of a light tan solid. The thus-obtained solid was recrystallized from a mixture of acetone and water and gave 3β-chloro-N,N-bis-(2-chloroethyl)-5-androsten-17β-amine having a melting point of 96 to 97° and the following analysis:

*Analysis.*—Calculated for $C_{23}H_{36}Cl_3N$: C, 63.80; H, 8.38; Cl, 24.57. Found: C, 63.92; H, 8.39; Cl, 24.49.

EXAMPLE 3

*3β - bromo - N,N-bis - (2 - bromoethyl)-5 - androsten-17β-amine and 3β-bromo-N-(2-bromoethyl)-5-androsten-17β-amine*

In the same manner as described in Example 2, but substituting thionyl bromide for thionyl chloride as the reagent, treating a crude mixture of 17β-bis-(2-hydroxyethyl)amino-5-androsten-3β-ol and 17β-(2-hydroxyethyl)amino-5-androsten-3β-ol with thionyl bromide is productive of 3β-bromo-N-(2-bromoethyl)-5-androsten-17β-amine and 3β-bromo-N,N-bis-(2-bromoethyl)-5-androsten-17β-amine, which are isolated following the procedure of Example 2.

EXAMPLE 4

*3β-chloro-N,N-bis-(2-iodoethyl)-5-androsten-17β-amine*

A mixture of 1 g. of 3β-chloro-N,N-bis-(2-chloroethyl)-5-androsten-17β-amine, 2.1 g. of sodium iodide and 50 ml. of acetone was heated under reflux for 24 hours, then was filtered while hot. The filtrate was cooled in an ice bath and gave a precipitate of 3β-chloro-N,N-bis-(2-iodoethyl)-5-androsten-17β-amine having a melting point of 130 to 135° C. After recrystallization from acetone, the compound melted at 133.8 to 135.6°.

In the same manner as described in Example 4, treating 3β - bromo - N,N - bis - (2 - bromoethyl) - 5 - androsten-17β-amine with sodium iodide in acetone is productive of 3β - bromo - N,N - bis - (2 - iodoethyl) - 5 - androsten-17β-amine.

EXAMPLE 5

*3β-chloro-N-(2-iodoethyl)-5-androsten-17β-amine*

In the same manner as given in Example 4, treating 3β - chloro - N - (2 - chloroethyl) - 5 - androsten - 17β-amine (from Example 2) with sodium iodide in acetone is productive of 3β-chloro-N-(2-iodoethyl)-5-androsten-17β amine. Similarly, treating 3β-bromo-N-(2-bromoethyl)-5-androsten-17β-amine (from Example 3) with sodium iodide in acetone is productive of 3β-bromo-N-(2-iodoethyl)-5-androsten-17β-amine.

EXAMPLE 6

*3β - chloro - N,N - bis - (2 - chloroethyl) - 5 - androsten-17β-amine hydrochloride*

Treating a solution of 3β-chloro-N,N-bis-(2-chloroethyl)-5-androsten-17β-amine in ethanol with one equivalent of concentrated aqueous hydrochloric acid is productive of 3β-chloro-N,N-bis-(2-chloroethyl)-5-androsten-17β-amine hydrochloride, which can be isolated by evaporation of the solvent.

In the same manner as shown above, treating 3β-chloro-N,N-bis-(2-chloroethyl)-5-androsten-17β-amine with sulfuric acid, phosphoric acid, hydrobromic acid, acetic acid, benzoic acid, or the like is productive of the corresponding acid addition salt.

EXAMPLE 7

*3β-bromo-N,N-bis-(2-iodoethyl)-5-androsten-17β-amine-hydrochloride*

Treating a solution of 3β-bromo-N,N-bis-(2-iodoethyl)-5-androsten-17β-amine in ethanol with one equivalent of concentrated aqueous hydrochloric acid is productive of 3β-bromo-N,N-bis-(2-iodoethyl)-5-androsten-17β-amine hydrochloride, which can be isolated by evaporation of the solvent.

In the same manner as given above, treating 3β-bromo-N,N-bis-(2-iodoethyl)-5-androsten-17β-amine with sulfuric acid, phosphoric acid, hydrobromic acid, acetic acid, benzoic acid, or the like is productive of the corresponding acid addition salt.

EXAMPLE 8

*3β-chloro-N-(2-chloroethyl)-5-androsten-17β-amine sulfate*

Treating a solution of 3β-chloro-N-(2-chloroethyl)-5-androsten-17β-amine in ethanol with one equivalent of aqueous sulfuric acid is productive of 3β-chloro-N-(2-chloroethyl)-5-androsten-17β-amine sulfate which can be isolated by evaporation of the solvent.

In the same manner as shown above, treating 3β-chloro-N-(2-chloroethyl)-5-androsten-17β - amine with hydrobromic acid, phosphoric acid, acetic acid, benzoic acid, and the like is productive of the corresponding acid addition salt.

EXAMPLE 9

*3β-bromo-N-(2-iodoethyl)-5-androsten-17β-amine hydrochloride*

Treating a solution of 3β-bromo-N-(2-iodoethyl)-5-androsten-17β-amine (from Example 7) in ethanol with one equivalent of concentrated aqueous hydrochloric acid is productive of 3β-bromo-N-(2-iodoethyl)-5-androsten-17β-amine hydrochloride, which can be isolated by evaporation of the solvent.

In the same manner as given above, treating 3β-bromo-N-(2-iodoethyl)-5-androsten-17β-amine with sulfuric acid, phosphoric acid, hydrobromic acid, acetic acid, benzoic acid, or the like is productive of the corresponding acid addition salt.

It is to be understood that the invention is not to be limited to the exact details of operation or exact compounds shown and described, as obvious modifications and equivalents will be apparent to one skilled in the art. The invention is therefore to be limited only by the scope of the appended claims.

We claim:

1. A compound of the formula

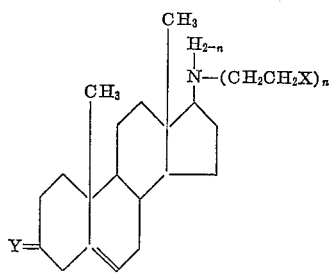

wherein X is a halogen of atomic weight between 35 and 127, inclusive, Y is selected from the group consisting of chlorine and bromine, and wherein $n$ is a whole number from 1 to 2, inclusive, and the pharmacologically acceptable mineral acid and organic acid amine addition salts thereof.

2. 3β-chloro-N,N-bis-(2-chloroethyl) - 5 - androsten-17β-amine.

3. 3β-chloro-N,N-bis-(2-chloroethyl) - 5 - androsten-17β-amine hydrochloride.

4. 3β-bromo-N,N-bis-(2-bromoethyl) - 5 - androsten-17β-amine.

5. 3β-chloro-N,N-bis-(2-iodoethyl) - 5 - androsten-17β-amine.

6. 3β-bromo-N,N-bis-(2 - iodoethyl) - 5 - androsten-17β-amine.

7. 3β-bromo-N,N-bis-(2 - iodoethyl) - 5 - androsten-17β-amine hydrochloride.

8. 3β-chloro-N-(2-chloroethyl) - 5 - androsten-17β-amine.

9. 3β-chloro-N-(2-chloroethyl) - 5 - androsten - 17β-amine hydrochloride.

10. 3β-bromo-N-(2-bromoethyl) - 5 - androsten-17β-amine.

11. 3β-chloro-N-(2-iodoethyl) - 5 - androsten - 17β-amine.

12. 3β-bromo-N-(2-iodoethyl) - 5 - androsten - 17β-amine.

13. 3β-bromo-N-(2-iodoethyl) - 5 - androsten - 17β-amine hydrochloride.

14. A compound of the formula

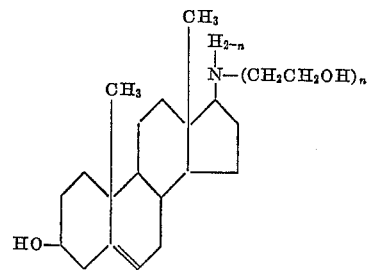

wherein $n$ is a whole number from 1 to 2, inclusive.

15. 17β-bis-(2-hydroxyethyl)amino-5-androsten-3β-ol.

16. 17β-(2-hydroxyethyl)amino-5-androsten-3β-ol.

17. A process for the production of a compound of the formula

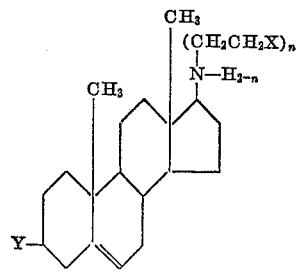

wherein X is a halogen of atomic weight between 35 and 127, inclusive, Y is selected from the group consisting of chlorine and bromine, and wherein $n$ is a whole number from 1 to 2, inclusive, which comprises: reacting 17β-amino-5-androsten-3β-ol with an hydroxy-ethylating agent to obtain a compound of the formula

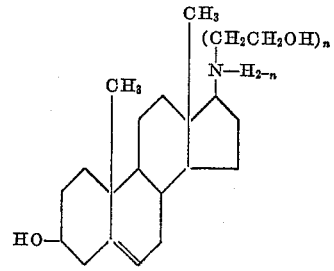

wherein $n$ is a whole number from 1 to 2, inclusive, and reacting the latter compound with a halogenating agent.

18. A process for the production of 3β-chloro-N,N-bis-(2-chloroethyl)-5-androsten-17β-amine which comprises: reacting 17β-amino-5-androsten-3β-ol in an inert solvent with ethylene oxide to obtain 17β-bis-(2-hydroxyethyl)-amino-5-androsten-3β-ol and reacting the latter compound with thionyl chloride in an inert solvent.

References Cited in the file of this patent
UNITED STATES PATENTS
2,655,520   Thome _____ Oct. 13, 1953

UNITED STATES PATENT OFFICE
Certificate of Correction

Patent No. 2,905,675                                                          September 22, 1959

Fred Kagan et al.

It is hereby certified that error appears in the printed specification of the above numbered patent requiring correction and that the said Letters Patent should read as corrected below.

Column 4, line 16, for "$C_{21}H_{32}Cl_2N_2 \cdot HCl$:" read —$C_{21}H_{33}Cl_2N_2 \cdot HCl$:—; line 66, for "17β amine." read —17β-amine.—; column 5, lines 70 to 74, the lower left-hand portion of the formula should read as shown below instead of as in the patent:

Signed and sealed this 12th day of April 1960.

[SEAL]

Attest:
KARL H. AXLINE,
*Attesting Officer.*

ROBERT C. WATSON,
*Commissioner of Patents.*